(12) United States Patent
Yano (10) Patent No.: US 6,394,612 B1
(45) Date of Patent: May 28, 2002

(54) IMAGE PROCESS APPARATUS AND IMAGE PROCESS METHOD

(75) Inventor: Kentaro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/188,318

(22) Filed: Nov. 10, 1998

(30) Foreign Application Priority Data

Nov. 14, 1997 (JP) ............................................... 9-313445

(51) Int. Cl.$^7$ ................................................ H04N 1/40
(52) U.S. Cl. ...................................... 357/457; 382/169
(58) Field of Search .................................. 358/457, 456, 358/458, 463, 464, 251, 504, 509, 516; 382/169, 283, 168, 251

(56) References Cited

U.S. PATENT DOCUMENTS

| | | | | |
|---|---|---|---|---|
| 4,313,124 A | | 1/1982 | Hara ....................... | 346/140 R |
| 4,345,262 A | | 8/1982 | Shirato et al. ........... | 346/140 R |
| 4,459,600 A | | 7/1984 | Sato et al. ............... | 346/140 R |
| 4,463,359 A | | 7/1984 | Ayata et al. .................. | 346/1.1 |
| 4,558,333 A | | 12/1985 | Sugitani et al. ......... | 346/140 R |
| 4,723,129 A | | 2/1988 | Endo et al. .................... | 346/1.1 |
| 4,725,966 A | * | 2/1988 | Darby ......................... | 364/518 |
| 4,740,796 A | | 4/1988 | Endo et al. .................... | 346/1.1 |
| 5,111,310 A | * | 5/1992 | Parker ......................... | 358/456 |
| 5,430,464 A | * | 7/1995 | Lumelsky ..................... | 345/191 |

FOREIGN PATENT DOCUMENTS

| | | |
|---|---|---|
| EP | 0 791 895 | 8/1997 |
| JP | 54-56847 | 5/1979 |
| JP | 59-123670 | 7/1984 |
| JP | 59-138461 | 8/1984 |
| JP | 60-71260 | 4/1985 |

OTHER PUBLICATIONS

M. Yao and K.J. Parker, "Application of Blue Noise Mask in Color Halftoning", Visual Communications and Image Processing '96, Mar. 17–20, 1996, Orlando, Florida (US), Proceedings, SPIE—The International Society for Optical Engineering; vol. 2727, Part 2, pp. 876–880 XP000901292.
"An Adaptive Algorithm for Spatial Grey Scale", Floyd et al., SID 75 Digest (1976).
"Digital Halftoning Technique Using a Blue–Noise Mask", J. Opt. Soc. Am. A/vol. 9, No. 11, Nov. 1992.

* cited by examiner

Primary Examiner—Jerome Grant, II
Assistant Examiner—Negussie Worku
(74) Attorney, Agent, or Firm—Fitzpatrick, Cella, Harper & Scinto (57) ABSTRACT

The invention is to provide image process apparatus and method which can represent, in case of performing quantization by using a blue noise mask, a blue noise characteristic for not only a halftone image based on a quantization result of one color but also a halftone image of mixed color formed based on quantization data of plural colors. That is, each of the input color image data of the plural colors is quantized into the quantization data of which bit number is smaller than that of the corresponding input data, by using any one of different blue noise masks, and a color image is formed based on the quantization data. The masks are respectively formed from one blue noise mask by a converter, and the mixed color produced based on the quantization results from these two masks represents the blue noise characteristic.

9 Claims, 6 Drawing Sheets

IMAGE PROCESS APPARATUS AND IMAGE PROCESS METHOD

BACKGROUND OF THE INVENTION

1. Field of the Invention

The present invention relates to image process apparatus and method for quantizing multivalue original image information into a recording level of a recording device.

2. Related Background Art

Recently, various office automation (OA) equipments such as a personal computer, a word processor and the like have come into wide use. In this connection, various recording methods such as an ink jet recording method, an electrophotographic recording method, a wire dot recording method and the like have been developed as methods to print out information input by the OA equipments. In such the current recording methods, a so-called binary recording method to record or not record a dot (i.e., recording pixel) on a recording medium is the mainstream. However, according to a recent advance in functions of the personal computer, the word processor and the like, it has popularized to output a photographic image, a desktop publishing (DTP) image or the like as a recording image. For this reason, it has been strongly expected to realize pure and fluent halftone representation.

A dither method and an error diffusion (ED) method have been known as typical methods to represent a halftone in such a binary recording device. Therefore, these two methods will be briefly explained as follows.

The dither method is a gradation representation method to represent gradation or tonality by initially determining a unit matrix for representing the gradation and then controlling the number of recording pixels to be recorded within the unit matrix. For example, in case of defining a 4×4 unit matrix, the number of recording pixels to be recorded within the defined matrix is controlled to be "0 dot" to "16 dots", thereby realizing 17-level gradation representation.

On the other hand, a principle of the ED method has been published in R. W. Floyd and L. Steinberg, "An Adaptive Algorithm for Spatial Gray Scale," SID 75 Digest (1976). That is, the ED method is the gradation representation method to perform quantization by calculating a density difference (i.e., error data) between an original image pixel density of each original image and a recording pixel density to be recorded by the recording device after the quantization, and diffusing the calculated error data to peripheral pixels before the quantization with specific weight added to each data.

The above recording device generates and records quantization recording data by using the above various methods. The serial-system recording device causes a recording head to scan a recording medium in a main-scan direction to perform the recording of one line, moves the recording medium for a predetermined amount in a sub-scan direction after the one-line recording terminates, and again causes the recording head to scan the recording medium. Although the details will be explained later, the serial-system recording device repeats the above operation to perform the recording. On the other hand, the line-system recording device has recording means arranged entirely along a width direction of the recording medium. Thus, the line-system recording device performs the recording by sequentially scanning the recording medium.

However, in such a conventional quantization method and the recording device using the conventional quantization method, there are following inconveniences.

In the dither method, the number of gradations being representable is limited according to a size of a basic matrix. Further, since the gradation is represented by repeating the basic matrices, it happens according to a kind of an original image pattern that periodical unevenness called texture appears on the recording image at a period synchronous with a period of the basic matrix. Such the periodical unevenness appears particularly on a halftone image to be output, as the serious inconvenience. For these reasons, generally speaking, the dither method is the quantization method not suitable for a photographic natural image.

To cope with the above inconvenience, several proposals to attempt to improve quality of the halftone image in the dither method have been presented. For example, as disclosed in Japanese Patent Application Laid-Open No. 56-146361, it has been proposed that a dither mask pattern is made different for each color. However, such a technique disclosed in Japanese Patent Application Laid-Open No. 56-146361 is merely the method in which, e.g., a dither matrix is formed simply by using random numbers, and thus does not reach a level to reproduce the sufficient halftone image quality.

On the other hand, in the ED method, since the error data between the original image density and the output density is spatially calculated, the number of gradations which is limited due to the matrix size in the dither method is not limited. Further, an output image faithful to the original image density can be reproduced. Therefore, as compared with the dither method, faithful halftone recording can be realized. Furthermore, in the ED method, compatibility of the number of gradations with resolution which can not be realized in the dither method can be realized. For these reasons, in case of outputting a photographic image of which needs have been increased particularly in recent years, the ED method has been generally accepted as a means capable of realizing an increase in the image quality as compared with the dither method. However, since the number of steps necessary to process one pixel in the ED method is significantly larger than that in the dither method, a remarkable process time is necessary in the ED method. The needs for the high-quality image has caused a rapid increase in the recording resolution of the recording device. However, the number of pixels to be processed has further increased in proportion to a square of the increase in the recording resolution. Therefore, a situation that, in the ED method, a process speed dominates a recording speed of the recording device occurs.

In case of reproducing the halftone gradation by using the recording device, it is strongly expected to establish a quantization technique which has both high speed performance of the dither method and satisfactory halftone reproduction performance of the ED method. As one proposal to realize such the technique, e.g., U.S. Pat. No. 5,111,310 discloses a quantization technique in which, as the feature of the high-speed process in quantization control equivalent to the process speed in the conventional dither method is maintained by using a sufficiently large dither matrix, a pattern representing a spatial frequency characteristic called a blue noise is laid out to the matrix to realize such the halftone reproduction as in the ED method. It should be noted that the above method is called as a blue noise dither method hereinafter. The details of the blue noise dither method are disclosed in many publications, e.g., Robert Ulichneey, "Digital Halftoning," The MIT Press Cambridge, Massachusetts London, England, and the like. The blue noise dither method is the method to perform the quantization by using the dither matrix which reduces a feeling of noise on the output image by suppressing a power spectrum of a low frequency component to which human eyes are most sensitive.

However, in such the blue noise dither method, the dither matrix is structured such that the blue noise pattern is laid out each color. Therefore, in a color image recording device, it happens that a mixed (or composite) color recorded on the basis of a result of a blue noise dither process performed for each color does not form or produce the blue noise pattern, whereby there is a drawback that the color image quality becomes degraded.

SUMMARY OF THE INVENTION

The present invention has been made in consideration of the above-described conventional problems, and an object of the present invention is to provide image process apparatus and method in which color image data of at least two colors are quantized by using different masks. In the apparatus and method, the quantization is performed by using the mask in which dots of secondary color represented by using the two colors quantized with the different masks are arranged such that these dots of the two colors are mixed to form a blue noise pattern, whereby gradation representation including not only a halftone image of recording colors (i.e., primary colors) of a recording device but also a halftone image of mixed color represented by a combination of the recording colors can be reproduced at high speed and with high image quality.

In order to achieve the above object, the image process apparatus according to the present invention comprises:

an input means for inputting the color image data of plural colors;

a quantization means for quantizing, by using the different mask, each of the color image data of the plural colors into quantization data of which bit number is smaller than the bit number of the corresponding input color image data; and an output means for outputting the quantization data of the plural colors obtained by the quantization means, wherein the quantization means quantizes the color image data of the plural colors respectively by using the different masks such that an image of mixed color formed based on the quantization data of the plural colors has a blue noise characteristic.

Further, the image process method according to the present invention comprising:

an input step of inputting the color image data of plural colors;

a quantization step of quantizing, by using the different mask, each of the color image data of the plural colors into quantization data of which bit number is smaller than the bit number of the corresponding input color image data; and an output step of outputting the quantization data of the plural colors obtained in the quantization step, wherein the quantization, step quantizes the color image data of the plural colors respectively by using the different masks such that an image of mixed color formed based on the quantization data of the plural colors has the blue noise characteristic.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the present invention and, together with the description, serve to explain the principles of the present invention.

DETAILED DESCRIPTION OF PREFERRED EMBODIMENTS

Preferred embodiments of the present invention will now be described in detail in accordance with the accompanying drawings.

(Outline)

In a quantization process according to the embodiments, a dither method is used as a quantization method, and a blue noise pattern is used as a dither matrix. Further, mask patterns of at least two colors are defined to be different patterns, and an arrangement of two-color (secondary color) dots represented by the different two colors is optimized to form the blue noise pattern. That is, the secondary color at a time of recording with use of the two colors has a characteristic acting as the blue noise pattern.

As above, in a color recording device performing the recording with plural recording colors, when the mask in which the secondary-color dots are arranged to form the blue noise pattern is used, it is possible to provide image process apparatus and method by which gradation representation including not only halftone of the recording color (primary color) but also halftone of mixed color represented by a combination of the plural recording colors can be reproduced at high speed and with high image quality.

(First Embodiment)

Figure 2:
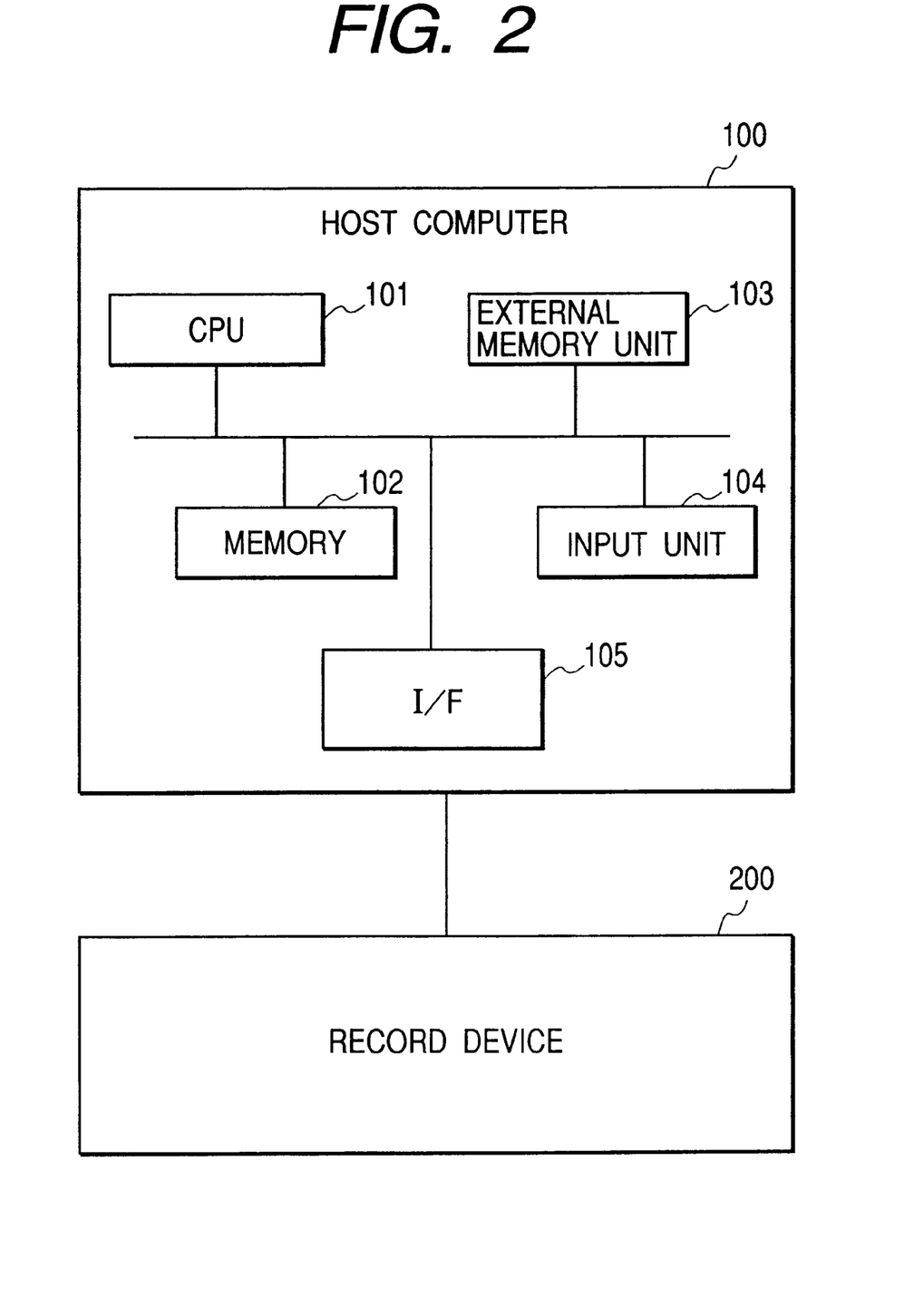
FIG. 2 is a block diagram showing an image process system according to the embodiment.

Subsequently, the first embodiment will be concretely explained with reference to the accompanying drawings. FIG. 2 is a block diagram showing an image process system to which the present invention is applied. In the drawing, a host computer 100 is composed of a CPU 101, a memory 102, an external memory unit 103, an input unit 104 and a printer interface 105. The CPU 101 executes a program stored in the memory 102 to realize a color process procedure, a quantization process procedure and the like (described later). Since the program has been stored in the external memory unit 103, it is supplied from an external device having the memory unit 103. Since the host computer 100 comprises a hardware for the quantization process, it may cause the hardware to perform the quantization process. Since the host computer 100 is connected to a recording device 200 through the interface 105, image data subjected to the color process is transmitted to the recording device 200 to cause the device 200 to perform print recording.

<Recording Device>

Figure 3:
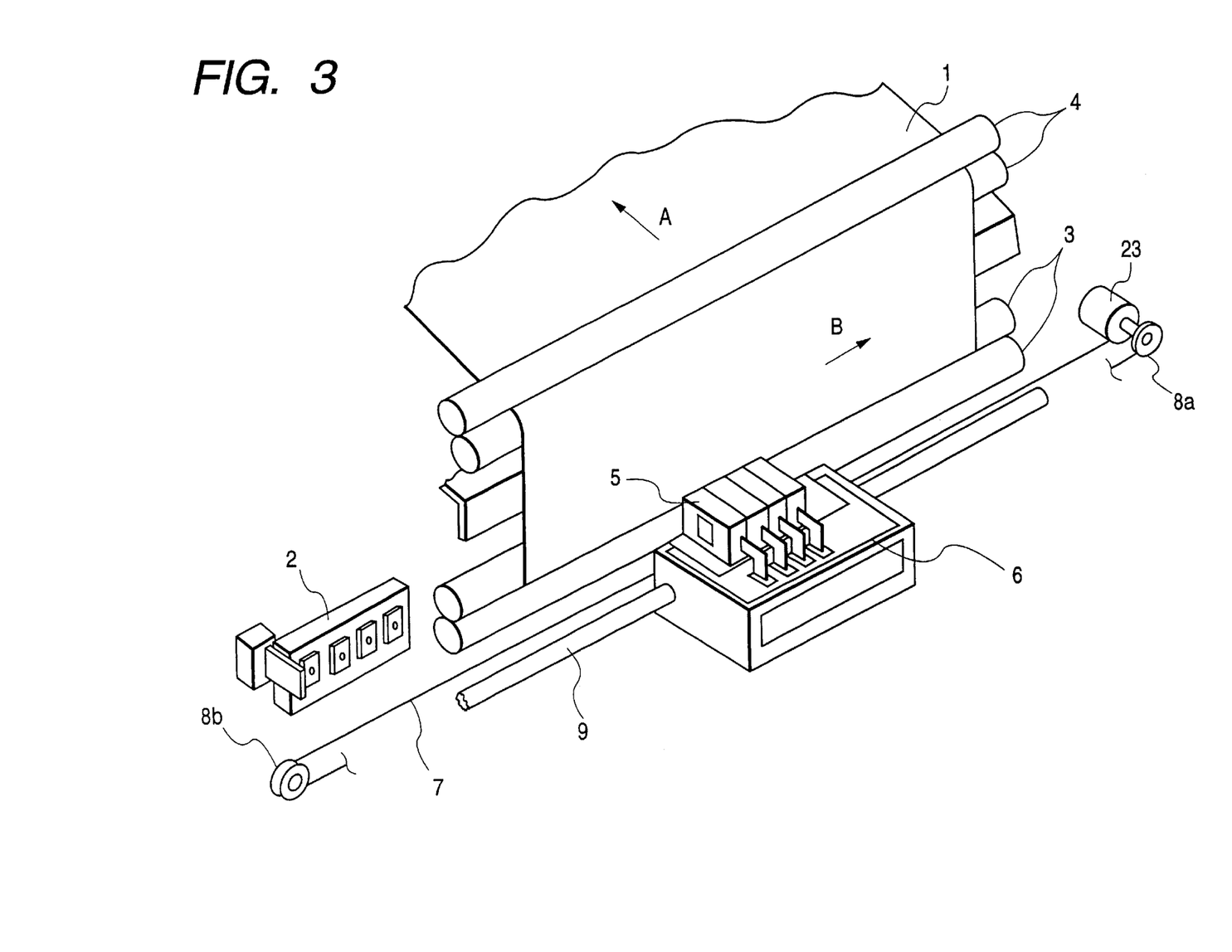
FIG. 3 is a perspective view showing a mechanism of a main part of a recording device.

FIG. 3 is a perspective view for explaining the recording device 200 in FIG. 2. In this case, the recording device of an ink jet system will be explained as an example.

Initially, an entire structure of the recording device 200 will be explained. In FIG. 3, numeral 1 denotes a sheet of paper or plastic (to be referred as recording sheet hereinafter). The plural recording sheets 1 stacked in a cassette or the like are fed by a paper feed roller (not shown) one by one, and then each sheet 1 is carried in a direction A by a pair of first carrier rollers 3 and a pair of second carrier rollers 4 arranged at a predetermined interval and respectively driven by stepping motors (not shown).

Numeral 5 denotes an ink jet-system recording head to perform the recording on the sheet 1. In the head 5, ink is supplied from a not-shown ink cartridge, and then emitted from a nozzle in response to an image signal. The recording head 5 and the ink cartridge are mounted on a carriage 6, and a carriage drive motor 23 is linked also to the carriage 6 through a belt 7 and pulleys 8a and 8b. Therefore, the carriage 6 is driven by the motor 23 to reciprocally scan the sheet 1 along a guide shaft 9.

By such the structure as above, as the recording head 5 moves in a direction B, it emits the ink onto the recording sheet 1 in response to the image signal so as to record an ink image. Then, the recording head 5 returns its home position according to necessity, so that clogging of the nozzle is removed by an ink recovery device 2, and also the carrier rollers 3 and 4 are driven to carry the recording sheet 1 for one line in the direction A. By repeating the above operation, predetermined recording is performed on the recording sheet 1.

Subsequently, a control system for driving the respective units in the recording device 200 will be explained.

Figure 4:
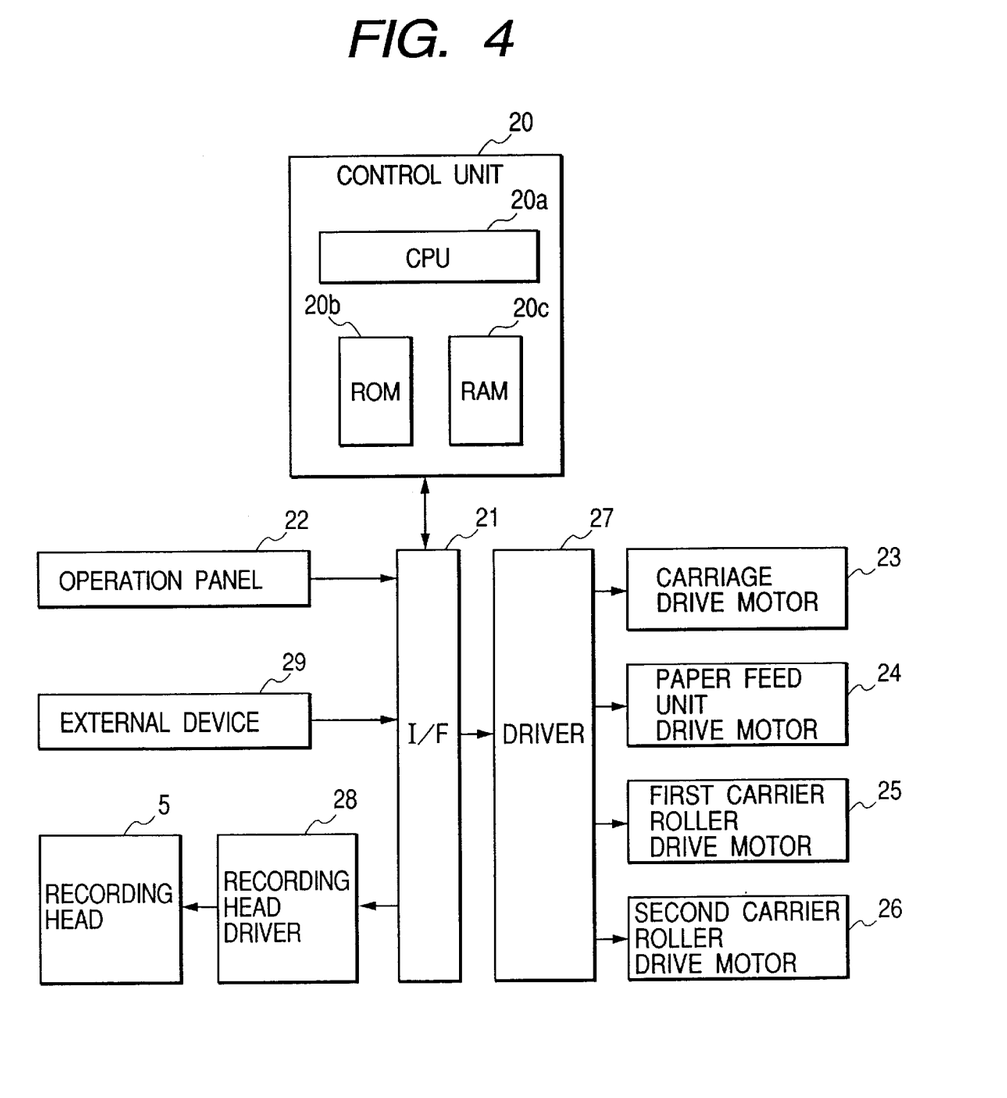
FIG. 4 is a block diagram for explaining a control logic of the recording device.

As shown in FIG. 4, the control system is composed of a control unit 20 having a CPU 20a such as a microprocessor or the like, a ROM 20b storing control programs for the CPU 20a and various data, and a RAM 20c used as a working area of the CPU 20a and temporarily storing various data; an interface 21; an operation panel 22; a driver 27 for driving various motors (carriage drive motor 23, paper feed unit drive motor 24, first carriage roller drive motor 25, and second carriage roller drive motor 26); and a recording head driver 28 for driving a recording head 5.

Through the interface 21, the control unit 20 performs an I/O (input/output) operation on various information (e.g., character pitch, character kind and the like) from the operation panel 22, an image signal from/to an external device 29, and the like. Also, the control unit 20 outputs ON and OFF signals to drive the motors 23 to 26, and the image signal to drive each unit.

<Image Process Unit>

Subsequently, it will be explained an image process method to be performed when recording data for the recording of the recording device is generated by the host computer 100.

The image process in the host computer 100 is performed by the CPU 101 on the basis of a program stored in the external memory unit 103. Also, the process can be realized by other hardware.

Figure 5:
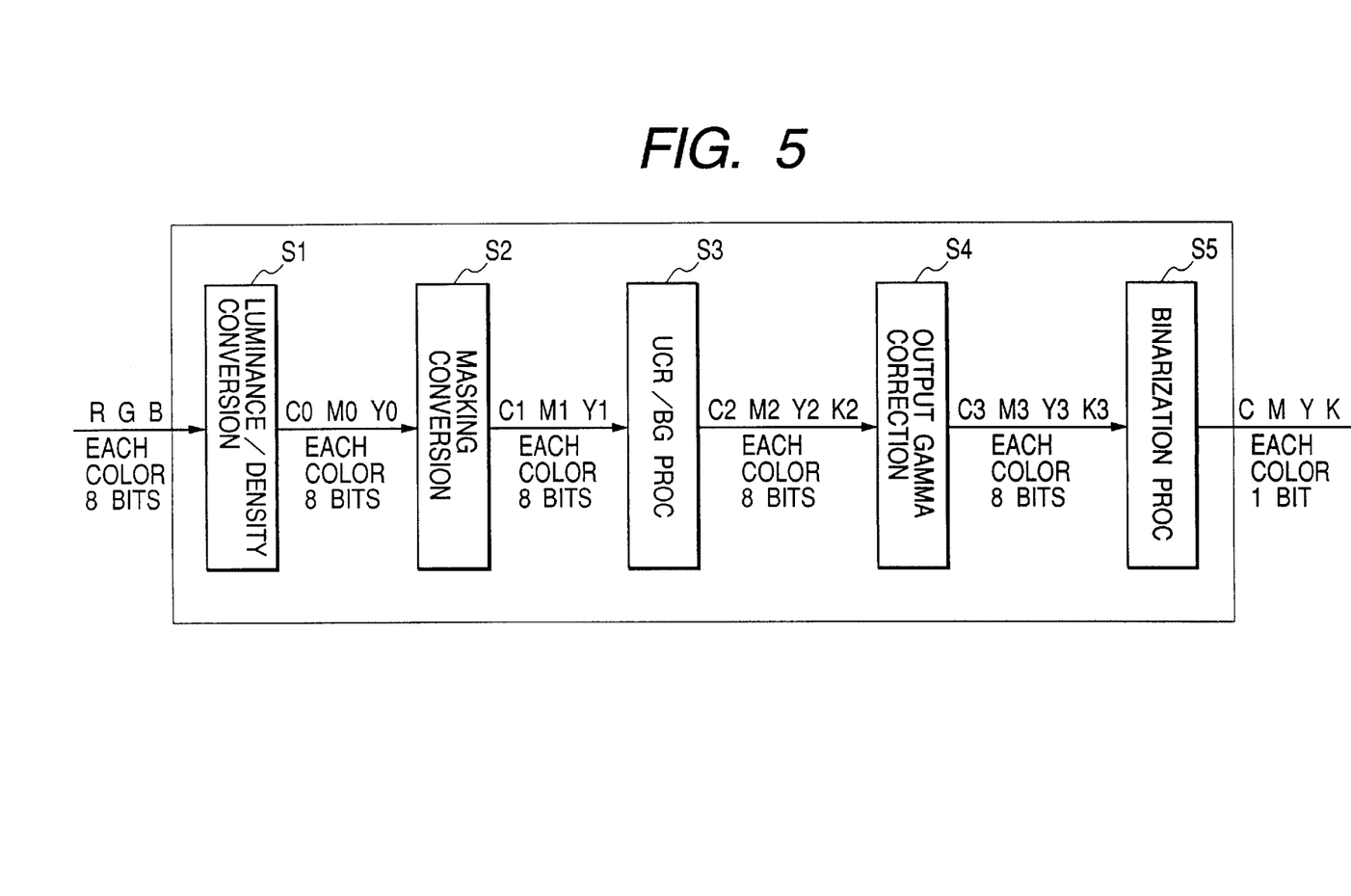
FIG. 5 is a view for explaining a flow of an image process.

FIG. 5 is a view for explaining the image process. Concretely, FIG. 5 shows a flow in the process for inputting R (red), G (green) and B (blue) eight-bit (i.e., 256 gradations) image data and then outputting C (cyan), M (magenta), Y (yellow) and K (black) one-bit data.

The R, G and B eight-bit image data are initially converted into C, M and Y eight-bit data in a step S1 which performs luminance/density conversion. In the embodiment, following logarithmic conversion is performed.

$$C0=(-255/2.4)\times(\log 10[R/255])$$

$$M0=(-255/2.4)\times(\log 10[G/255])$$

$$Y0=(-255/2.4)\times(\log 10[B/255])$$

Subsequently, in a masking step S2, the C0, M0 and Y0 eight-bit data are subjected to masking conversion for color spatial conversion. In the embodiment, [3×3] matrix conversion is performed on the input C0, M0 and Y0 eight-bit data to output C1, M1 and Y1 eight-bit data.

Subsequently, an under color removal and black generation (UCR/BG) process for black generation is performed in an UCR/BG step S3. In this step, the under color removal process and the black generation process are performed on the C1, M1 and Y1 eight-bit data to generate C2, M2, Y2 and K2 eight-bit data. Concretely, a minimum value uc (uc=min [CMY]) of each of the C1, M1 and Y1 recording data is removed therefrom as under color, and then a black generation component according to the removed value uc is added respectively to the C1, M1, Y1 and K data, thereby generating the C2, M2, Y2 and K2 data.

$$C2=C1-uc+CGR[uc]$$

$$M2=M1-uc+MGR[uc]$$

$$Y2=Y1uc+YGR[uc]$$

$$K2=KGR[uc]$$

In this case, when CGR[uc], MGR[uc] and YGR[uc] have a value "zero" for all "uc", the black generation is performed only by a K ink image. On the other hand, when CGR[uc], MGR[uc] and YGR[uc] have values according to "uc", a part of the black component removed as the under color is represented as. the K ink data, and the remains of the black component are represented as mixture (i.e., composite K)) of C, M and Y color components.

After then, the C2, M2, Y2 and K2 eight-bit data are subjected to output gamma correction in a step S4, and thus a color process completes. Then, C3, M3, Y3 and K3 eight-bit data obtained in the output gamma correction is converted into the C, M, Y and K one-bit information in a random-dither area gradation representation process in a binarization process step S5 to generate the binary recording data indicating "print" and "no print". The generated binary recording data is transferred to the recording device, and the recording is performed. Concretely, in the step S5, the C3, M3, Y3and K3 eight-bit data are respectively compared with thresholds within the dither matrix and converted into the one-bit information according to respective compared results (i.e., larger or smaller than thresholds).

The random dither method used in the embodiment is the above blue noise dither method. Matrix mask formation manner and characteristic of the blue noise dither method are disclosed in above U.S. Pat. No. 5,111,310; "Journal of Electronic Imaging" January 1994, Vol. 3(1), pp. 92–97; and "Digital Halftoning Technique Using a Blue-Noise Mask" J. Opt. Soc. AmA, Vol. 9, No. 11, November 1992, and have been well known by a person skilled in this field of art. Therefore, detailed explanation of the random dither method is omitted in the embodiment.

<Quantization Process>

In the above image process, since the random dither method is used as the quantization method, a load of the process can be remarkably reduced as compared with the case where the ED method is used as the quantization method, whereby the high-speed recording can be realized. In addition, the high-quality halftone image recording can be realized as compared with the case where the conventional dither method is used as the quantization method. For these reasons, it can be stated that the random dither method is one of optimal options in consideration of a balance of necessary process capacity and output image quality. However, even in the random dither method, such a problem as previously described is involved. That is, this method involves the problem that some noise impression tends to appear particularly at a highlight portion in the halftone. Although there are many reasons of such noise impression at the highlight portion, some typical reasons will be explained hereinafter.

One of the reasons is that a power spectrum exists in a low-frequency area. As described above, the sensitivity of the human eyes to the low-frequency area is remarkably higher than that to a high-frequency area. Therefore, it has been: known that, if periodicity (i.e., power spectrum) exits in the low-frequency area, such the periodicity acts as noise impression to cause a feeling of wrongness or strangeness. In this connection, even if the dither matrix to which the blue noise dither method is applied is used, since it is difficult to completely eliminate the low-frequency spectrum in the entire halftone area, there is some fear that the partially remaining power spectrum in the low-frequency area causes the noise impression. This is because it is extremely difficult to form the dither matrix capable of completely eliminating the low-frequency spectrum in the output image of the entire gradation area. In case of forming the dither matrix, as the thresholds are sequentially applied to the matrix, a degree of freedom applicable for the threshold comes to be restricted. It is assumed that the thresholds from "0" to "255" are applied to the matrix. In this case, if the threshold "127" is defined as a standard and application of the thresholds to the matrix starts from the standard in due order, the final threshold "255" must be applied automatically to a position (or place) being vacant at that time. In other words, there is no degree of freedom of the position to which the final threshold "255" can be applied. In the case where the thresholds are applied to one dither matrix, since the degree of freedom of the position to which the later-applied threshold is applied must be lower than that of the position to which the initial threshold is applied, it is difficult to establish the :complete blue noise pattern in the entire gradation area. Therefore, since the low-frequency power spectrum can not be completely eliminated in the practical matrix pattern, it causes the noise impression in the output image.

Further, even in a case where the blue noise pattern being complete in principle is realized, the recording device has various dispersion factors (or variation factors) in the recording. For example, such a serial printer as above performs the recording of one line as causing the recording-head to scan the recording medium, carries the recording medium for one line after the one-line recording terminates, and repeats the above operations for the recording. However, a position at which a recording pixel is recorded disperses or varies because of the various dispersion factors such as dispersion in the scanning amount of the recording head or the recording medium, dispersion in the position at which the recording head of each color is mounted, and the like. Due to such the dispersion, a frequency characteristic of the practical print image varies from a blue noise characteristic to a white noise characteristic, so that the output image comes to have a rough feel through which the noise impression expands entirely.

The entire image area is equally under the influence of the above various dispersion factors irrespective of the gradation value of the output image. However, if an observer observes the recording image in detail, he visually feels that the noise impression at the low-gradation area in the highlight portion is most intense. In this connection, it is difficult to consider that the: recording position of the recording pixel becomes extremely wrong at the time when the recording of the low-gradation area is performed. That is, even in middle- and high-gradation areas, similarly the recording position disperses and thus the frequency characteristic in each of these areas varies from the blue noise characteristic to the white noise characteristic. However, such the positional dispersion does not so influence these areas visually. Since the visual influence belongs to a psychological value, it is difficult to clear up the causes of such a fact. However, it can be considered that one of the great factors is a difference in contrast. In the highlight portion, since the recording dots are scatteringly recorded on the white recording medium, the position of each recording pixel is clear. On the other hand, in the gradation portion of which density is equal to or higher than the certain-extent level, a large number of recording dots are concentrated within a certain area, whereby such the gradation portion is visually perceived to be gray as a whole. Since the halftone is represented by the binary recording, of course the observer can perceive condensation and rarefaction in dot density. Therefore, if the recording dot position entirely comes to have the white noise characteristic, the observer can discriminate such the noise impression. However, the noise impression is perceived by discriminating the periodicity at the recording dot position in a background color. Therefore, in the background of the middle- and high-gradation portion which has been substantially grayed as compared with the highlight portion, since the contrast between the existing recording dot and the background is sufficiently low, it can be considered that the observer does not visually perceive the noise impression depending on such the periodicity, intensively. Here, it is important the fact that, in a case where a printing area or region covered by the printing in unit area is defined as an area factor, it is more difficult for the observer to visually perceive the noise impression due to the white noise in the image of which area factor is high (i.e., ratio or percentage of remaining white background on paper is small), as compared with the image of which area factor is low.

That is, a method for increasing the area factor is one of effective methods for reducing the noise impression appeared in the halftone area of the binary recording image. In any case, colors of various hues are used in a photographic image in which it is strongly expected to faithfully reproduce the halftone. However, since the recording colors prepared in the general color recording device are three colors of C, M and Y, various tones are reproduced by combining such primary colors (C, M and Y). Therefore, in order to reduce the noise impression throughout the entire image, it is insufficient only to improve the halftone image of the primary color, but is important to reduce the noise impression in mixed color (or composite color) of secondary or more color. Since the mixed color is generated by a combination of the primary-color dots, it is desirable to control dot generation such that the primary-color dots do not overlap to each other as much as possible to enlarge the area factor. Namely, if the mask pattern of each color in the random dither method is set to differ for each color, the area factor in the mixed-color halftone image recording can be relatively increased. Thus, the improvement of quality in the photographic halftone image consisting of the various-hue colors can be realized.

However, there is a case:where the noise impression can not be reduced only by setting the mask pattern to differ for each color at random. Even if each primary-color random dither mask pattern is used as the blue noise pattern to reduce the noise impression, since most of the photographic images which attach importance to the halftone image are recorded with the mixed color as described above, there is a case where, according to the combination of the respective-color dots, the dot arrangement is not the blue noise arrangement when entirely observing these dots constituting the mixed color. In order to reduce the noise impression, the mask is shifted for each color with the aim of reducing the area factor. Thus, since the contrast between the dot color and the background color is reduced, the dot itself becomes unremarkable visually. However, since the spacial frequency characteristic of the dot arrangement is shifted toward the low-frequency side, there is some fear that the reduction of the noise impression can not be entirely realized.

Therefore, the spatial frequency characteristic of the primary-color halftone recording image is defined as the blue noise, and the dither mask for each color is set as the different mask with the aim of increasing the area factor. Concretely, since C and M tend to influence the noise impression especially in low lightness, the dither masks of C and M are provided respectively as the independent masks. Thus, when the halftone image of B (blue) being the mixed color of C and M is reproduced, if the C and M dither masks each holding the blue noise characteristic are used for the mixed-dot arrangement of C and M, the noise impression of the photographic output image containing many mixed-color halftone images can be reduced in the halftone recording.

Figure 1:
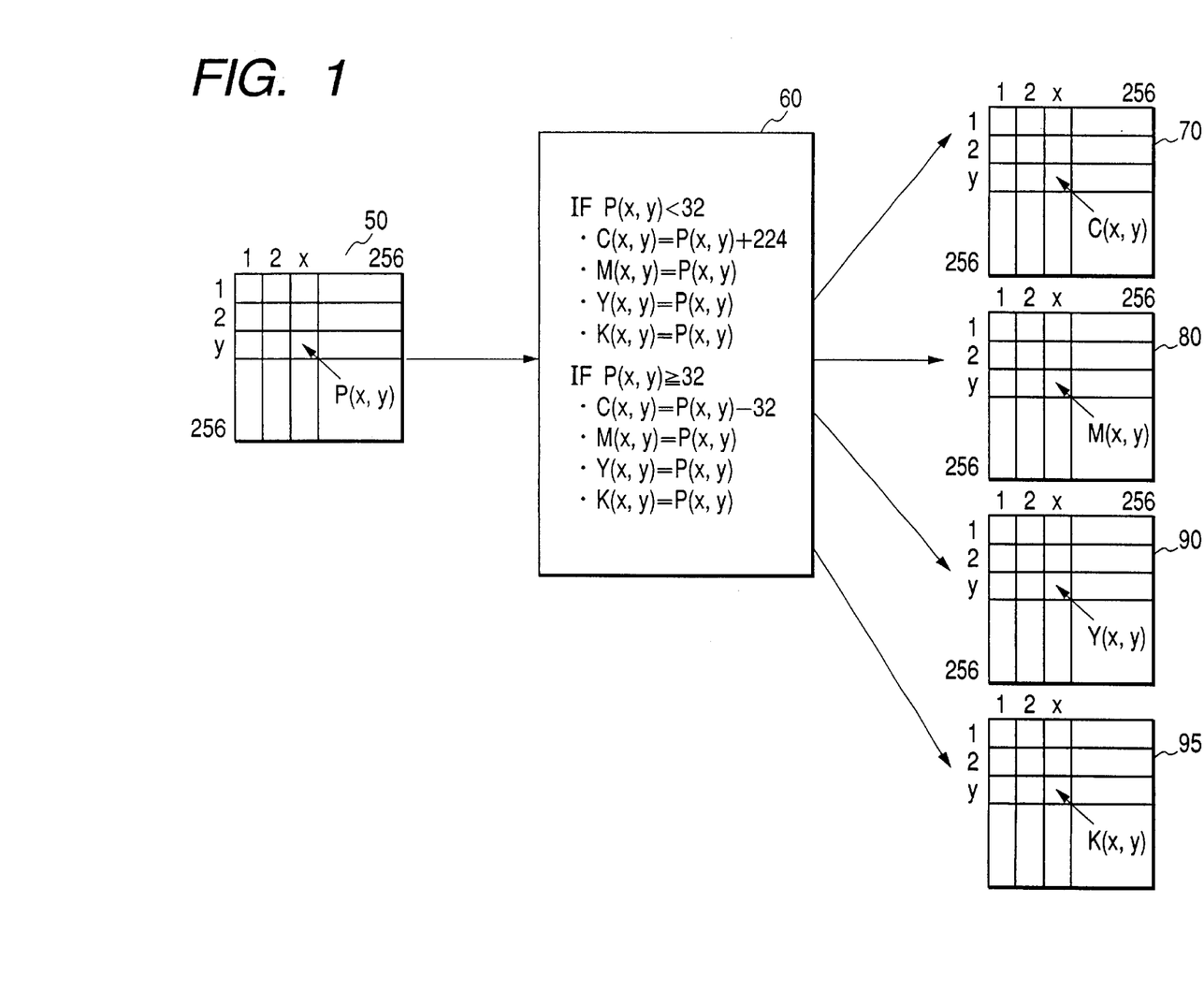
FIG. 1 is a view showing a method to form a quantization dither mask for each color in an embodiment of the present invention.

FIG. 1 is a view showings!a method to form the dither mask pattern which satisfies such a condition as above. In FIG. 1, numeral 50 denotes a blue noise dither mask pattern (i.e., base mask pattern) formed in an already-known method, in which the spatial frequency characteristic indicates the blue noise characteristic. This pattern has a matrix size of [256×256] in which 256 evaluation values (i.e., thresholds) from "0" to "255" are arranged respectively in row and column thereof. Numerals 70, 80, 90 and 95 respectively denote C, M, Y and K dither mask patterns. Each mask pattern is formed based on data from the base mask pattern 50 through data conversion in a conversion unit 60. In this case, it is assumed that the evaluation value in x row and y column of the pattern 50 is P(x,y), the evaluation value of the C dither mask pattern 70 is C(x,y), the evaluation value of the M dither mask pattern 80 is M(x,y), the evaluation value of the Y dither mask pattern 90 is Y(x,y), and the evaluation value of the K dither mask pattern 95 is K(x,y). Then, the values C(x,y), M(x,y), Y(x,y) and K(x,y) are generated by the conversion unit 60 according to the value P(x,y), as follows.

When P(x,y)<32,
C(x,y)=P(x,y)+224
M(x,y)=P(x,y)
Y(x,y)=P(x,y)
K(x,y)=P(x,y)
when P(x,y)≧32,
C(x,y)=P(x,y)+32
M(x,y)=P(x,y)
Y(x,y)=P(x,y)
K(x,y)=P(x,y)

By setting the dither mask pattern for each color as above, the B(blue)-system color to be reproduced as the mixed color of the C and M primary colors is reproduced as follows.

In case of printing the low-gradation B image of which gradation value is equal to or lower than "32"(32/255), the C dot printing starts from the position at which the M dot of which gradation value is "32" or higher is printed. Therefore, for example, the dot position obtained by logical OR of the C and M dots constituting the B image of which gradation value is "32" is identical with the position of the dot M of which gradation value is "64". As described above, as the gradation value increases and thus the area factor increases, the noise impression is reduced even in the identical spatial frequency characteristic. Therefore, if the above C and M mask patterns are set, since the B-system image has the large area factor as compared with the primary-color same- and low-gradation images and further the dot pattern containing the C and M dots has the blue noise characteristic, the noise impression is muliplicatively suppressed. Of course, in the setting of the mask pattern according to the embodiment, since the B-system image of which gradation value is "64" or higher is printed by overlapping the C and M dots, an effect to increase the area factor is lowered. However, in the portion of which gradation value is high (i.e., high-density portion), since the noise impression is reduced or lowered, whereby any problem does not occur.

Critical points of all the recording device for reducing the noise impression are of course not identical with others because they are influenced by the-recording device resolution, the dot density and the like. Therefore, there is the system in which it is insufficient only to suppress the noise impression at the gradation value equal to or lower than "64" as in the embodiment. Conversely, there is the system in which the noise impression can not be already recognized or perceived at the further-lower gradation portion. For these reasons, since an optimal value should be set in an objective system, the gradation value is not limited to "64" as in the embodiment.

Further, the blue noise characteristic in the embodiment is defined as follows.

That is, when "R" is a grid interval of dot and "g" is a print ratio, if a main frequency (i.e., cutoff frequency)"fg" is defined as follows, $$fg = g^{\hat{}}(\frac{1}{2})/R \quad (g \leq \frac{1}{2}) \quad (\frac{1}{2}=50\%)$$

$$fg = (1-g)^{\hat{}}(\frac{1}{2})/R \quad (g > \frac{1}{2})$$

the blue noise characteristic is defined to have the spatial frequency characteristic in which an integrated value (sum) of the power spectrum on the high frequency side of which frequency is equal to or higher than the main frequency fg of the output image is higher than a integrated value (sum) of the-power spectrum on the low frequency side of which frequency is lower than the main frequency fg, and to be an output image characteristic in which the power spectrum for the spatial frequency smoothly and continuously varies.

As described above, according to the first embodiment, in the recording device which quantizes the multivalue data into the quantization level of the recording device itself by using the dither matrix and then performs the recording, the different masks are used for at least two colors as the mask patterns used in the quantization process. Then, such the quantization is performed by using the mask in which the secondary-color dot arrangement represented by using the two colors quantized with the different masks comes into the blue noise pattern by mixing the dots of these two colors, whereby the gradation representation including not only the halftone image of the recording colors (i.e., primary colors) of the recording device but also the halftone image of the mixed color represented by the combination of the recording colors can be reproduced at high speed and with high image quality.

(Second Embodiment)

Subsequently, the second embodiment in which the mask for each color is formed will be explained.

In the above first embodiment, the M (magenta) dither mask is offset and used as the C (cyan) dither mask. However, the masks may be formed as follows.

Figure 6:
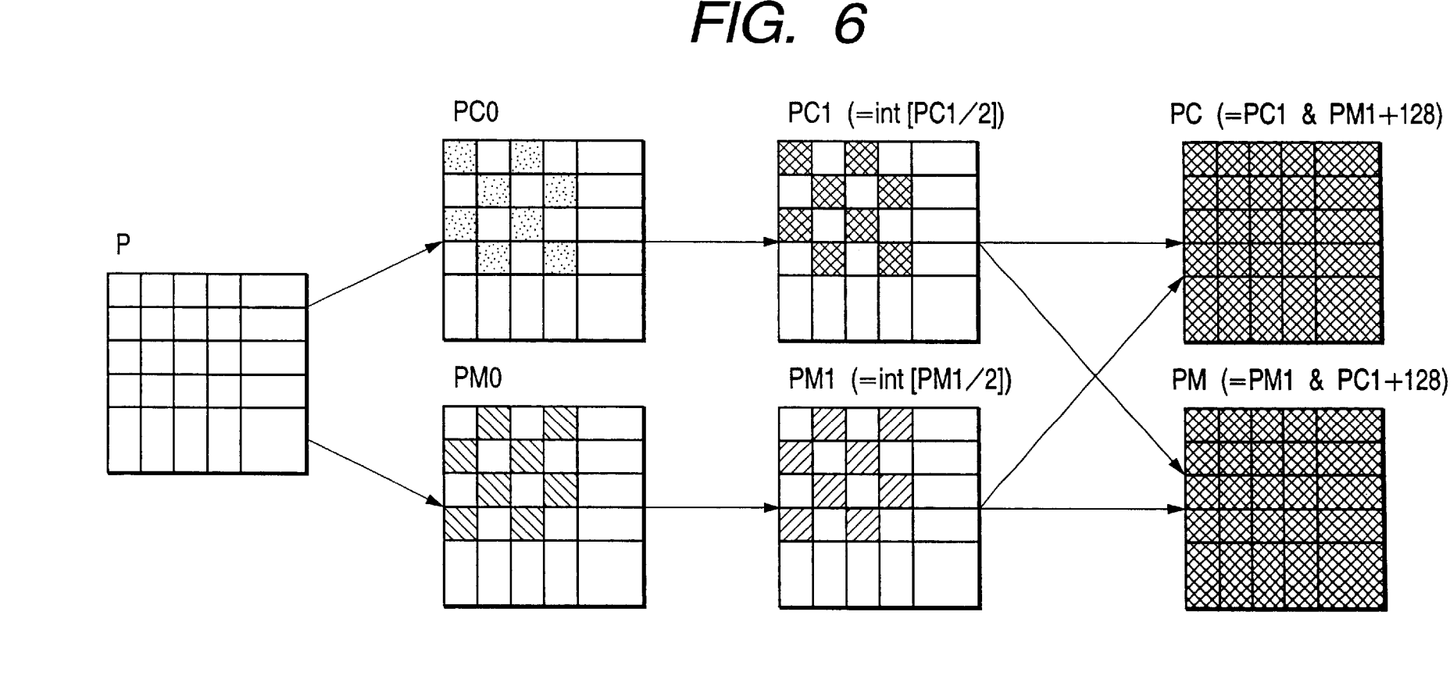
FIG. 6 is a view for explaining a method to form a mask in a second embodiment.

FIG. 6 is a view for explaining a mask formation method in the second embodiment. In FIG. 6, symbol P denotes a Y (yellow) mask of "256×256" pixels having the blue noise characteristic, and acting as a base mask from which the C and M masks are formed. Since the base mask P has the same eight-bit (256) gradations as in the first embodiment, 256 values (referred as evaluation values hereinafter) from "0" to "255" are applied to each term of the "256×256" pixels. Here, the evaluation values of staggered positions on the base mask P are extracted to form a mask PC0, and similarly the evaluation values of reverse staggered positions on the base mask P are extracted to form a mask PM0. Since the mask PC0 which is obtained by extracting the evaluation values from the staggered positions on the mask P also has evaluation values from "0" to "255", these evaluation values are respectively divided by "2" (i.e., dividing each evaluation value by "2" to obtain quotient of integral part) to form a mask PC1 which has values from "0" to "127". Similarly, evaluation values of the mask PM0 are respectively divided by "2" to form a mask PM1. Then, a dither mask PC which consists of staggered positions to which the evaluation values of the mask PC1 are applied and reverse staggered positions to which the evaluation values of the mask PM1 each added with "128" are applied is formed as the C mask. Similarly, a dither mask PM which consists of reverse staggered positions to which the evaluation values of the mask PM1 are applied and staggered positions to which the evaluation values of the mask PC1 each added with "128" are applied is formed as the M mask.

As above, since each of the C and M masks is formed by combining the evaluation values, the B halftone image up to 50% gradation value can be set to have the area factor twice as much as the primary-color halftone image of the same gradation value. Further, the spatial frequency characteristic of the B-system halftone image of which lightness is low and in which the noise impression is thus remarkable can be reproduced in the blue noise characteristic, so that a photographic image or the like can be recorded with high image quality.

(Other Embodiments)

In the above embodiments, the C and M dither masks are particularly explained. However, it is of course possible to optimize the Y dither mask or the mask of each primary color of the recording device such that the area factor is improved when the mixed color consisting of the primary colors is reproduced. Further, in the above embodiments, the mask having the blue noise characteristic is particularly explained. However, such the effects of the present invention as described above can be derived if the spatial frequency characteristic of the recording image relatively satisfies [power spectrum of low-frequency portion] <[power spectrum of high-frequency portion].

Furthermore, in the above embodiments, the mask patterns of plural colors are formed from the base mask having one blue noise characteristic. For example, as shown in FIG. 6, it is of course possible that the dot-printable position has been previously defined as the staggered position, the reverse staggered position or the like, and then a pattern having the blue noise characteristic is independently formed at the readable position. Even in this case, it is unnecessary to define such the position as the staggered position or the reverse staggered position. However, if the same color becomes a solid mass in the printing of the mixed color, beautiful representation of the mixed color is prevented. For this reason, it is desirable that the same-color dots are scattered. as much as possible.

Particularly in the ink jet recording method of the above embodiments, if a means (e.g., electrothermal energy converter, laser beam or the like) to generate heat energy for discharging ink is provided and a system to change an ink state by using the heat energy is used, high-density and high-accuracy recording can, be achieved.

Typical structure and basic principle of such the method are preferably disclosed in, e.g., U.S. Pat. Nos. 4,723,129 and 4,740,796. This method can be applied to both a drop-on-demand ink jet printer and a continuous ink jet printer, and is particularly effective in the drop-on-demand printer. That is, in the drop-on-demand ink jet printer, the electrothermal energy converter is arranged to correspond to a sheet or a liquid path holding liquid (i.e., ink), at least one drive signal corresponding to recording information and causing a rapid temperature increase exceeding film boiling is applied to the electrothermal energy converter to generate the heat energy, and thus the film boiling is caused on a heat acting face of the recording head, whereby a bubble one-to-one corresponding to the drive signal can be formed in the liquid (ink). The liquid (ink) is then discharged through a discharge aperture by growing and compressing the bubble, and at least one droplet is formed. If the drive signal has a pulse shape, the bubble can be appropriately and rapidly grown and compressed, whereby the liquid (ink) of which response is particularly excellent can be discharged preferably.

As the drive signal having the pulse width, such signals as disclosed in U.S. Pat. Nos. 4,463,359 and 4,345,262 are suitable. Further, if a condition disclosed in U.S. Pat. No. 4,313,124 concerning a temperature increase rate on the heat acting face of the recording head is applied, more excellent recording can be achieved.

As the structure of the recording head, in addition to such the structure as disclosed in the above documents that the discharge aperture, the liquid path and the electrothermal energy converter are combined with others (including linear liquid flowing path or right-angle liquid flowing path), structures in U.S. Pat. Nos. 4,558,383 and 4,459,600 that a heat acting face is provided in a curved area are included in the present invention. In addition, a structure in Japanese Patent Application Laid-Open No. 59-123670 that a common slot acts as discharge units of plural electrothermal energy converters, and a structure in Japanese Patent Application Laid-Open No. 59-138461 that an aperture for absorbing pressure wave of heat energy is provided in correspondence with a discharge unit may be applied.

Further, as the recording head of full-line type having a length corresponding to a width of maximum recording medium being recordable by the recording device, either a structure that such the length is satisfied by the combination of the plural recording heads as shown in the above documents or a structure that a single recording head is integrally formed may be applied.

Furthermore, in addition to such the cartridge-type recording head as explained in the above embodiments in which the ink tank is integrally mounted on the recording head itself, a changeable chip-type recording head which is mounted to the device body to allow electrical connection to the device body and ink supply from the device body may be used.

Furthermore, it is preferable to add a recording head recovery means, a recording head preliminary means and the like to the structure of such the recording device as explained above, because the recording operation can be made more stable. For example, a head capping means, a head cleaning means, a head pressing means, a head sucking means, the electrothermal energy converter, a heat element different from the electrothermal energy converter, a preliminary heat means consisting of the electrothermal energy converter and the other heat element, and the like can be added. Furthermore, it is effective for the stable recording to provide a predischarge mode in which ink discharging independent of the recording is performed.

The above embodiments are explained on the premise that the ink is liquid. However, an ink solidified or caked at a temperature equal to or lower than a room temperature, and an ink softened or liquefied at the room temperature may be used. Alternatively, since the ink itself in the ink jet system is generally controlled to have the temperature within a range from 30° C. to 70° C. to maintain ink viscosity within a stable discharge range, an ink liquefied just at the time when the recording signal to be used is applied may be used.

Furthermore, in order to actively prevent temperature increase caused by the heat energy by utilizing the temperature increase as energy to change an ink solid state to an ink liquid state, or in order to prevent ink evaporation, an ink which is solidified in an exposed state and liquidized by the heating may be used. In any case, the present invention can be applied to a case where ink having a property liquidized only by applying heat energy is used. As such the ink, e.g., the ink which is liquidized by applying the heat energy according to the recording signal and then discharged, the ink which has already started solidifying when it reaches the recording medium, and the like can be used. In such the case, as shown in Japanese Patent Application Laid-Open No. 54-56847 or 60-71260, the ink which has been held in concavities or through holes of a porous sheet as solid material may be opposite to the electrothermal energy converter. In the present invention, execution of the above film boiling method is most effective to the above various ink.

Furthermore, as the recording device according to the present invention, besides an image output terminal integrated with or separated from an information process equipment such as a computer or the like, a copy machine combined with a reader or the like, and also a facsimile apparatus having a data transmission/reception function may be used.

Furthermore, the present invention can be applied to a system consisting of plural devices such as a host computer, an interface equipment, a reader, a printer and the like, or to an apparatus comprising a single device such as a copy machine, a facsimile apparatus or the like.

Furthermore, the present invention can be applied to a case where a storage medium storing therein program codes of software to realize the functions of the above embodiments is supplied to a system or an apparatus, and thus a computer (or CPU, MPU) in the system or apparatus reads and executes the program codes stored in the medium.

In this case, the program codes themselves read out of the storage medium realize the functions of the above embodiments. Therefore, the storage medium storing these program codes constitutes the present invention. As the storage medium from which the program codes are supplied, e.g., a floppy disk, a hard disk, an optical disk, a magneto-optical disk, a CD-ROM, a CD-R, a magnetic tape, a non-volatile memory card, a ROM and the like can be used.

Further, it can be obviously understood that the present invention includes not only a case where the functions of the above embodiments are realized by executing the program codes read by the computer, but also a case where an OS (operating system) or the like running on the computer performs a part or all of the actual processes on the basis of instructions of the program codes and thus the functions of the above embodiments are realized by such the processes.

Furthermore, it can be obviously understood that the present invention also includes a case where, after the program codes read out of the storage medium are written into a function expansion board inserted in the computer or a memory in a function expansion unit connected to the computer, a CPU or the like provided in the function expansion board or the function expansion unit performs a part or all of the actual processes on the basis of the instructions of the program codes, and thus the functions of the above embodiments are realized by such the processes.

As explained above, according to the present invention, the color image data of at least two colors are quantized by using the different masks, and such the quantization is performed by using the mask in which the dots of the secondary color represented by using the two colors quantized with the different masks are arranged such that these dots of the two colors are mixed to form the blue noise pattern. Therefore, the gradation representation including not only the halftone image of the recording color (i.e., primary color) of the recording device but also the halftone image of the mixed color represented by the combination of the recording colors can be reproduced at high speed and with high image quality.

As described above, the present invention can be applied to the system constituted by plural devices, or to the apparatus comprising a single device. Furthermore, it goes without saying that the present invention is applicable also to a case where the object of the present invention is attained by supplying a program to a system or apparatus.

As many apparently widely different embodiments of the present invention can be made without departing from the spirit and scope thereof, it is to be understood that the present invention is not limited to the specific embodiments thereof expect as defined in the appended claims.

What is claimed is:

1. An image processing apparatus, comprising:

input means for inputting color image data of plural colors;

quantization means for quantizing each of the color image data of the plural colors into quantization data of which a bit number is smaller than a bit number of the corresponding input color image data, the quantization means quantizing the color image data by using a different mask for each respective color image data for each of the plural colors; and output means for outputting the quantization data of the plural colors obtained by said quantization means, wherein said quantization means quantizes the color image data of the plural colors respectively by using the different masks such that an image of mixed color formed based on the quantization data of the plural colors has a blue noise characteristic, wherein a mask used to quantize the color image data of at least one color is obtained by offsetting in a gradation direction a part of masks having a blue noise characteristic used to quantize the color image data of others of the plural colors, and wherein the blue noise characteristic is a characteristic that a power spectrum of a low frequency area in the image formed based on the quantization data of the plural colors is smaller than a power spectrum of a high frequency area.

2. An image processing apparatus, comprising:

input means for inputting color image data of plural colors;

quantization means for quantizing each of the color image data of the plural colors into quantization data of which a bit number is smaller than a bit number of the corresponding input color image data, the quantization means quantizing the color image data by using a different mask for each respective color image data for each of the plural colors; and output means for outputting the quantization data of the plural colors obtained by said quantization means, wherein said quantization means quantizes the color image data of the plural colors respectively by using the different masks such that an image of mixed color formed based on the quantization data of the plural colors has a blue noise characteristic, wherein a mask used to quantize the color image data of at least one color is obtained by offsetting in a gradation direction a part of masks having a blue noise characteristic used to quantize the color image data of others of the plural colors, and wherein said quantization means quantizes the color image data of the plural colors respectively by using the different masks, such that an integrated value (sum) of power spectra on a side of a frequency equal to or higher than a main frequency (cut-off frequency) fg of the image formed based on the quantization data of the plural colors comes to be equal to or higher than an integrated value (sum) of power spectra on a side of a frequency lower than the frequency fg.

3. An apparatus according to claim 2, wherein the frequency fg is defined by $$fg = g^{(1/2)}/R \text{ (where } g < 1/2) \text{ } (1/2 = 50\%)$$

$$fg = (1-g)^{(1/2)}/R \text{ (where } g > 1/2),$$

where R denotes a grid interval of recording dots, and g denotes a print ratio.

4. An image processing apparatus, comprising:

input means for inputting color image data of plural colors;

quantization means for quantizing each of the color image data of the plural colors into quantization data of which a bit number is smaller than a bit number of the corresponding input color image data, the quantization means quantizing the color image data by using a different mask for each respective color image data for each of the plural colors; and output means for outputting the quantization data of the plural colors obtained by said quantization means, wherein said quantization means quantizes the color image data of the plural colors respectively by using the different masks such that an image of mixed color formed based on the quantization data of the plural colors has a blue noise characteristic, wherein a mask used to quantize the color image data of at least one color is obtained by offsetting in a gradation direction a part of masks having a blue noise characteristic used to quantize the color image data of others of the plural colors, and wherein a ratio (area factor) of a recording medium covered with recording dots in a unit area of the image of mixed color formed based on the quantization data of the plural colors is larger than an area factor in a case where a same gradation as that of the mixed-color image is recorded with one color, and a spatial frequency characteristic of the image of mixed color has the blue noise characteristic.

5. An apparatus according to claim 1, further comprising recording means for recording and forming a color image on a basis of the quantization data of the plural colors output by said output means.

6. An apparatus according to claim 5, wherein said recording means records and forms the color image by applying ink droplets to a recording medium.

7. An image processing method, comprising the steps of:

an input step of inputting color image data of plural colors;

a quantization step of quantizing each of the color image data of the plural colors into quantization data of which a bit number is smaller than a bit number of the corresponding input color image data, the quantization step quantizing the color image data by using a different mask for each respective color image data for each of the plural colors; and an output step of outputting the quantization data of the plural colors obtained in said quantization step, wherein said quantization step quantizes the color image data of the plural colors respectively by using the different masks such that an image of mixed color formed based on the quantization data of the plural colors has a blue noise characteristic, wherein a mask used to quantize the color image data of at least one color is obtained by offsetting in a gradation direction a part of masks having a blue noise characteristic used to quantize the color image data of others of the plural colors, and wherein the blue noise characteristic is a characteristic that a power spectrum of a low frequency area in the image formed based on the quantization data of the plural colors is smaller than a power spectrum of a high frequency area.

8. An image processing method, comprising the steps of:

an input step of inputting color image data of plural colors;

a quantization step of quantizing each of the color image data of the plural colors into quantization data of which a bit number is smaller than a bit number of the corresponding input color image data, the quantization step quantizing the color image data by using a different mask for each respective color image data for each of the plural colors; and an output step of outputting the quantization data of the plural colors obtained in said quantization step, wherein said quantization step quantizes the color image data of the plural colors respectively by using the different masks such that an image of mixed color formed based on the quantization data of the plural colors has a blue noise characteristic, wherein a mask used to quantize the color image data of at least one color is obtained by offsetting in a gradation direction a part of masks having a blue noise characteristic used to quantize the color image data of others of the plural colors, and wherein said quantization step quantizes the color image data of the plural colors respectively by using the different masks, such that an integrated value (sum) of power spectra on a side of a frequency equal to or higher than a main frequency (cut-off frequency) fg of the image formed based on the quantization data of the plural colors comes to be equal to or higher than an integrated value (sum) of power spectra on a side of a frequency lower than the frequency fg.

9. An image processing method, comprising the steps of:

an input step of inputting color image data of plural colors;

a quantization step of quantizing each of the color image data of the plural colors into quantization data of which a bit number is smaller than a bit number of the corresponding input color image data, the quantization step quantizing the color image data by using a different mask for each respective color image data for each of the plural colors; and an output step of outputting the quantization data of the plural colors obtained in said quantization step, wherein said quantization step quantizes the color image data of the plural colors respectively by using the different masks such that an image of mixed color formed based on the quantization data of the plural colors has a blue noise characteristic, wherein a mask used to quantize the color image data of at least one color is obtained by offsetting in a gradation direction a part of masks having a blue noise characteristic used to quantize the color image data of others of the plural colors, and wherein a ratio (area factor) of a recording medium covered with recording dots in a unit area of the image of mixed color formed based on the quantization data of the plural colors is larger than an area factor in a case where a same gradation as that of the mixed-color image is recorded with one color, and a spatial frequency characteristic of the image of mixed color has the blue noise characteristic.

* * * * *

UNITED STATES PATENT AND TRADEMARK OFFICE
CERTIFICATE OF CORRECTION

PATENT NO.    : 6,394,612 B1
DATED         : May 28, 2002
INVENTOR(S)   : Yano

It is certified that error appears in the above-identified patent and that said Letters Patent is hereby corrected as shown below:

Column 1,
Line 16, "the" (second occurrence) should be deleted;
Line 21, "it has popularized" should read -- it has become popular --; and
Line 67, "following" should read -- the following --.

Column 2,
Line 6, "Such the" should read -- Such --;
Line 31, "can not" should read -- cannot --; .
Line 53, "the" should be deleted;
Line 59, "such the" should read -- such --; and
Line 61, "as a" should read -- a --.

Column 3,
Line 4, "such the" should read -- the --;
Line 6, "out each" should read -- out for each --;
Line 20, "color:" should read -- color --;
Line 36, "bit" should read -- the bit --;
Line 47, "comprising:" should read -- comprises --; and
Line 52, "bit" should read -- the bit --.

Column 5,
Line 3, "referred" should read -- referred to --;
Line 19, "such the" should read -- the --; and
Line 50, "it will" should read -- there will --.

Column 6,
Line 25, "Y2=Yluc+YGR[uc]" should read -- Y2=Yl-uc+YGR[uc] --,
Line 35, "K))" should read -- K) --;
Line 47, "Y3and" should read -- Y3 and --;
Line 52, "Matrix mask" should read -- The manner of matrix mask --; and
Line 53, "manner and characteristic" should read -- and characteristics --.

UNITED STATES PATENT AND TRADEMARK OFFICE
CERTIFICATE OF CORRECTION

PATENT NO. : 6,394,612 B1
DATED : May 28, 2002
INVENTOR(S) : Yano

It is certified that error appears in the above-identified patent and that said Letters Patent is hereby corrected as shown below:

Column 7,
Line 10, "such the" should read -- the --;
Line 17, "been:" should read -- been -- and "exits" should read -- exists --;
Line 18, "such the" should read -- the --;
Line 43, ":complete" should read -- complete --;
Line 45, "can not" should read -- cannot --; and
Line 61, "such the" should read -- the --.

Column 8,
Line 4, "the:" should read -- the --;
Line 10, "such the" should read -- the --;
Line 21, "such the" should read -- the --;
Line 26, "such the" should read -- the --;
Line 35, "such the" should read -- the --;
Line 36, "the fact" should be deleted; and
Line 66, "case:where" should read -- case where --.

Column 9,
Line 13, "spacial" should read -- spatial --;
Line 15, "can not" should read -- cannot --; and
Line 31, "showings!a" should read -- showing a --.

Column 10,
Line 20, "whereby" should be deleted;
Line 24, "the-recording" should read -- the recording --;
Line 29, "can not" should read -- cannot --;
Line 37, "frequency)"fg"" should read -- frequency) "fg" --;
Line 47, "a" should read -- an --;
Line 48, "the-power" should read -- the power --; and
Line 57, "such the" should read -- the --.

Column 11,
Line 13, "(referred" should read -- (referred to --;
Line 54, "such the" should read -- the --; and
Line 67, "such the" should read -- the --.

UNITED STATES PATENT AND TRADEMARK OFFICE
CERTIFICATE OF CORRECTION

PATENT NO.    : 6,394,612 B1
DATED         : May 28, 2002
INVENTOR(S)   : Yano

It is certified that error appears in the above-identified patent and that said Letters Patent is hereby corrected as shown below:

Column 12,
Line 10, "can," should read -- can --;
Line 11, "such the" should read -- the --;
Line 38, "such" should be deleted;
Line 55, "such the" should read -- the --; and
Line 59, "such the" should read -- the --.

Column 13,
Line 1, "such the" should read -- the --;
Line 32, "such the" should read -- such --; and
Line 38, "ink." should read -- inks. --.

Column 14,
Line 5, "such the" should read -- such --;
Line 14, "such the" should read -- such --;
Line 17, "such the" should read -- the --; and
Line 38, "expect" should read -- except --.

Signed and Sealed this

Twenty-ninth Day of October, 2002

*Attest:*

JAMES E. ROGAN
*Director of the United States Patent and Trademark Office*

*Attesting Officer*